Figure 1:
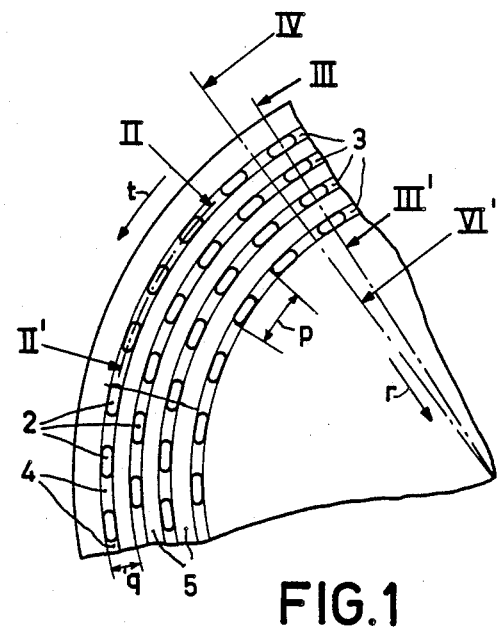

United States Patent [19]

Dil

[11] Patent Number: 4,930,116
[45] Date of Patent: May 29, 1990

[54] RECORD CARRIER CONTAINING INFORMATION IN AN OPTICALLY READABLE INFORMATION STRUCTURE

[75] Inventor: Jan G. Dil, Eindhoven, Netherlands

[73] Assignee: U.S. Philips Corporation, New York, N.Y.

[21] Appl. No.: 6,613

[22] Filed: Jan. 26, 1979

[30] Foreign Application Priority Data

Oct. 19, 1978 [NL] Netherlands .......................... 7810463

[51] Int. Cl.⁵ ................................................ G11B 7/00
[52] U.S. Cl. .................................... 369/275.1; 369/109
[58] Field of Search ................ 179/100.3 V, 100.3 G, 179/100.4 C, 100.41 L; 274/41 R, 41.6 R, 42 R; 358/127–132; 365/120, 121, 124, 126; 269/109–111, 275

[56] References Cited

U.S. PATENT DOCUMENTS

| | | | |
|---|---|---|---|
| 3,287,563 | 11/1966 | Clunis | 179/100.3 V |
| 3,737,589 | 6/1973 | Redlich et al. | 179/100.4 C |
| 3,838,401 | 9/1974 | Graf et al. | 179/100.3 G |
| 3,919,465 | 11/1975 | Adler et al. | 179/100.3 V |
| 3,931,459 | 1/1976 | Korpel | 179/100.3 V |
| 4,041,530 | 8/1977 | Kramer et al. | 179/100.3 V |
| 4,041,532 | 8/1977 | Plows et al. | 179/100.4 C |
| 4,084,185 | 4/1978 | deLang et al. | 179/100.3 G |
| 4,094,013 | 6/1978 | Hill et al. | 365/234 |
| 4,115,809 | 9/1978 | Ueno | 179/100.4 C |
| 4,161,752 | 7/1979 | Basilico | 179/100.3 V |
| 4,209,804 | 6/1980 | Dil | 369/109 |
| 4,556,967 | 12/1985 | Braat | 369/275 |

OTHER PUBLICATIONS

Braat and Bouwhuis, "Optical Video Disks with Undulating Tracks", Applied Optics, vol. 17, No. 13, 7/78, pp. 2022–2028.
Sheng, "Theoretical Considerations of Optical Diffraction from RCA Video Disc Signals", RCA Review, vol. 39, 9/78, pp. 512–555.
Adler, An Optical Video Disc Player for NTSE Receivers, Transactions BTR, 8/74, pp. 230–234.
Dil and Jacobs, "Apparent Size of Reflecting Polygonal Obstacles of the Order of One Wavelength", J. Opt. Soc. Am., vol. 64, No. 7, 7/79, pp. 950–960.
Korpel, "Simplified Diffraction Theory of the Video Disk", Applied Optics, vol. 17, No. 13, 7/78, pp. 2037–2042.

Primary Examiner—Alan Faber
Assistant Examiner—Steven R. Garland
Attorney, Agent, or Firm—Algy Tamoshunas; Leroy Eason

[57] ABSTRACT

A record carrier is described having an optically readable information structure comprising information areas arranged in information tracks and spaced from each other by intermediate areas. The information areas have a first, comparatively large, phase depth and the intermediate areas have a second, comparatively small, phase depth thereby providing an optimum information signal and an optimal tracking signal during reading.

18 Claims, 4 Drawing Sheets

RECORD CARRIER CONTAINING INFORMATION IN AN OPTICALLY READABLE INFORMATION STRUCTURE

The invention relates to a record carrier containing information in an optically readable information structure, comprising information areas arranged in information tracks, which areas in the track direction are spaced from each other by intermediate areas, the information tracks being spaced from each other by intermediate lands and the information areas having a phase depth which is substantially constant over the entire record carrier.

U.S. Pat. No. 3,931,459 describes such a record carrier as a medium for the dissemination of a colour television programme. The radiation-transmitting information structure is read with a read beam which is focussed to a read spot of the order of magnitude of the information areas by an objective system. The read beam is modulated by the information structure and is concentrated onto a radiation-sensitive information detection system. The information structure may be regarded as an amplitude-weighted phase structure, which means that during reading of the structure the phase difference between the various portions of the read beam coming from the record carrier varies depending on the part of the information structure being read at a given instant. At the location of the information detection system the various beam portions interfere with each other, so that the intensity of the radiation received by the information detected system, and thus the output signal of the detection system, varies in accordance with the information being read.

The information areas of an optical record carrier may comprise pits which have been pressed onto the record carrier surface or hills which project from the surface. Instead of a radiation transmitting information structure it is alternatively possible to use a radiation reflecting structure.

Since some time the applicant has been using the concept of "phase depth" for the information structure.

During reading, the information structure is illuminated with a read spot of the order of magnitude of the information areas. The information structure may be regarded as a diffraction grating which splits the read beam into a number of diffracted orders. To these orders a specific phase and amplitude may be attributed. The "phase depth" as ued herein is defined as the difference between the zero diffracted order and the first diffracted order phase, if the center of the read spot coincides with the center of an information area.

During reading of the record carrier care must be taken that the center of the read spot always coincides with the center of the track portion being read, because otherwise the modulation depth of the signal being read is small and cross-talk may occur between adjacent tracks. Therefore, a tracking signal is derived during reading which provides an indication of the position of the read spot relative to the center of the track portion being read. This signal is applied to a servo system with the aid of which the position of the read spot can be corrected.

As described in U.S. Pat. No. 3,931,459, the tracking signal can be generated with the aid of two radiation sensitive detectors which are disposed in the far field of the information structure on both sides of a line which is effectively parallel to the track direction. If the center of the read spot coincides with the center of the track, the two detectors receive equal amounts of radiation. If the center of the read spot is offset relative to the center of a track portion being read, one of the detectors will receive more radiation than the other, depending on the direction of movement. This method of detection, for which the intensity difference between two beam portions passing through different pupil halves is determined, is referred to as "push pull" detection. The pupil is the exit pupil of an objective system which is located between the record carrier and the detectors. If the tracking signal thus derived should be optimum the "phase difference" defined in U.S. Pat. No. 3,931,459 should be an odd multiple of 90° in accordance with this patent. The phase difference is then defined as the difference between the phase of a beam portion coming from an information area and the phase of a beam portion coming from the vicinity of that information area. Generally, this phase difference differs from the phase depth defined hereinbefore. Only if the phase difference is 180° and the walls of the information areas are perpendicular, will the phase difference be equal to the phase depth. A phase difference of 90° does not correspond to a phase depth of 90° but, depending on inter alia the width of the information areas, to a phase depth of, for example, 115°.

If the actual information is to be read by detecting the intensity variation of the total radiation passing through the pupil (so-called "central aperture" detection) a phase depth of 115° is by no means optimum.

It is an object of the present invention to provide a record carrier which during reading produces both an optimum information signal and an optimum tracking signal. To this end the record carrier in accordance with the invention has an optically readable structure comprised of information areas arranged in tracks and spaced from each other in the track direction by intermediate areas. The tracks are in turn spaced from each other by generally coplanar lands. The intermediate areas differ optically from the lands and have a substantially constant phase depth between 95° and 145° over the entire record carrier, while the phase depth of the information areas is approximately 180°.

Whereas in previously proposed record carriers information areas also served as servo areas for positioning the read spot relative to the center of a track portion being read, the intermediate areas in the record carrier now proposed form the servo areas. The intermediate areas thus define a servo track for maintaining the beam centered on the track being read. The phase depth of the information areas now has an optimum value for "central aperture" reading of the information, while the phase depth of the intermediate areas has the comparatively small value which is optimum for generating the tracking signal by push pull reading. It is essential that the phase depth of the intermediate areas is sufficiently small so that during reading in the central aperture mode these areas produce a negligibly small signal.

In U.S. Pat. No. 3,931,459 it has been assumed that the information areas have perpendicular walls or, put differently, that the angle of inclination of the walls is 0°. The angle of inclination of the walls is to be understood to mean the acute angle between these walls and the normal to the plane of the lands, that plane defining one surface of the record carrier. In practice it has been found that for a well-controlled optical recording of information areas in a so-called "master" and for a reproducible method of copying the master, an angle of inclination for the information areas should be adopted which differs substantially from 0°.

With the method of recording now preferred the intermediate areas of small phase depth can be realized almost exclusively in the form of pits or hills of moderate slope, i.e. with large angles of inclination.

A preferred embodiment of a record carrier in accordance with the invention, having a radiation reflecting information structure, is therefore characterized in that the phase depth of the intermediate areas has a value between approximately 100° and approximately 110°. The intermediate areas are substantially V-shaped and the angle of inclination between the walls of the information areas or the intermediate areas and the normal to the plane of the lands is in the range of 25° to 65° or the range from 80° to 85°, respectively. Further, the geometrical distance between the plane of the information areas and the plane of the intermediate lands is in the range from 165/N nm, to 270/N nm, N being the refractive index of a transparent medium which covers the information structure.

In theory the intermediate areas may have a V-shape with acute angles. However, in practice the intermediate areas will be pits or hills with a more gradual slope. These intermediate areas have no flat bottom or top, such as the information areas. The phase depth of the intermediate areas is mainly determined by the wall steepness. The range within which the phase depth may vary is small, so that the range within which the angle of inclination of the intermediate areas may vary is also correspondingly small. The optimum value for the angle of inclination within these ranges depends on the read beam used. When a read beam is used which is produced by a helium-neon laser the optimum angle of inclination differs a few degrees from the optimum angle of inclination when an AlGaAs diode laser is used.

As to the information areas, it has been found that the phase depth of the information areas, in addition to the geometrical depth of the pits or the geometrical height of the hills, is determined by:

the effective wavelength of the read beam related to the effective width of the information areas,
the state of polarization of the read beam, and
the angle of inclination of the walls of the information areas.

The width of the information areas, which is equal to that of the intermediate areas, is the dimension of the areas transverse to the track direction. The effective wavelength is the wavelength close to the information structure and outside the radiation-reflecting layer which may be disposed on the information structure. If the information structure is covered with a transparent protective layer, the effective wavelength is equal to the wavelength in free space divided by the refractive index of the protective layer. The effective width of an information area is the average width, i.e. if the walls have a constant inclination, the width at half the depth of a pit or the width at half the height of a hill.

If the angle of inclination were smaller than approximately 25°, the phase depth would vary to a slight extent as a function of the angle of inclination. For angles of inclination greater than approximately 25°, which are of practical significance, the magnitude of the angle of inclination will have a substantial influence on the phase depth of the information area if the effective wavelength is of the same order of magnitude as or smaller than the effective width of the areas. This is, for example, the case when an information structure for which the maximum width of the information areas and of the intermediate areas is of the order of 625 nm, is read with the aid of a read beam produced by a helium-neon laser which emits a wavelength $\lambda_0$ of 633 nm in free space.

A record carrier in accordance with the invention, which is adapted to be read with a He-Ne read beam is characterized in that the width, transverse to the track direction, of the information areas and intermediate areas is approximately 625 nm, that the angle of inclination of the walls of the information areas is 45° to 50°, and the geometrical distance between the plane of the information areas and the plane of the lands is approximately 195/N nm, and that the phase depth of the intermediate areas is approximately 100° and the angle of inclination of the walls of the intermediate areas is 84°.

Moreover, a greater value of the angle of inclination for the information areas corresponds to a greater value for the geometrical height or depth of the information areas.

In view of the influence of the intermediate areas on the information signal a record carrier in accordance with the invention is even more suitable to be read with a read beam supplied by a semiconductor diode laser, specifically an AlGaAs diode laser which emits a wavelength in the range from approximately 780 nm to approximately 860 nm, than with a read beam produced by a He-Ne laser. At a value of the order of 625 nm for the maximum width of the information areas, the effective wavelength is then greater than the effective width of the information areas. The state of polarization of the read beam then also determines the phase depth. For central aperture reading the influence of the angle of inclination of the walls of the information areas and the intermediate areas on the phase depth is small. Conversely, the wall steepness of said areas is of importance in the case of push-pull reading of the intermediate areas.

A record carrier in accordance with the invention, which is adapted to be read with a read beam produced by an AlGaAs laser diode, is characterized in that the width, transverse to the track direction, of the information areas and intermediate areas is approximately 625 nm, that the angle of inclination of the walls of the information areas has a value in the range from 30° to 60°, that the geometrical distance between the plane of the information areas and that of the lands is approximately 195/N nm, and that the phase depth of the intermediate areas is 100° and the angle of inclination of the walls of the intermediate areas is 82°. For the information areas, at any value of the angle of inclination in the range from 30° to 60° an arbitrary value may be chosen for the geometrical distance in the range from 195/N nm to 235/N nm. For smaller values for the depth or height of the information areas, the read beam is preferably polarized perpendicularly, i.e. the electric field vector of the radiation is perpendicular to the longitudinal direction of the information areas and intermediate areas.

In the case of reading with a read beam produced by an AlGaAs diode laser the intermediate areas are hardly detected in the central aperture mode.

The values of the angle of inclinations specified for the various record carriers apply to the transitions between the information areas or intermediate areas and the lands. The angles of inclination of the transitions in the track direction between the information areas and the intermediate areas are of the same order of magnitude.

The present invention can be used in a record carrier with prerecorded information and also in a record carrier to be inscribed with information by the user. In such a record carrier the address information is prerecorded and is contained in sector addresses, each track containing a specific number of such addresses. The sector addresses occupy only a small part of the tracks. The track portions between the sector addresses are of an inscribable material, for example a thin metallic layer, in which the user can record information for example, by locally melting the metal with a laser beam. A sector address contains the address information of the associated inscribable track portion in the form of address areas which are spaced from each other by intermediate areas. The address areas in accordance with the invention have a greater phase depth than the intermediate areas.

Figure 5:
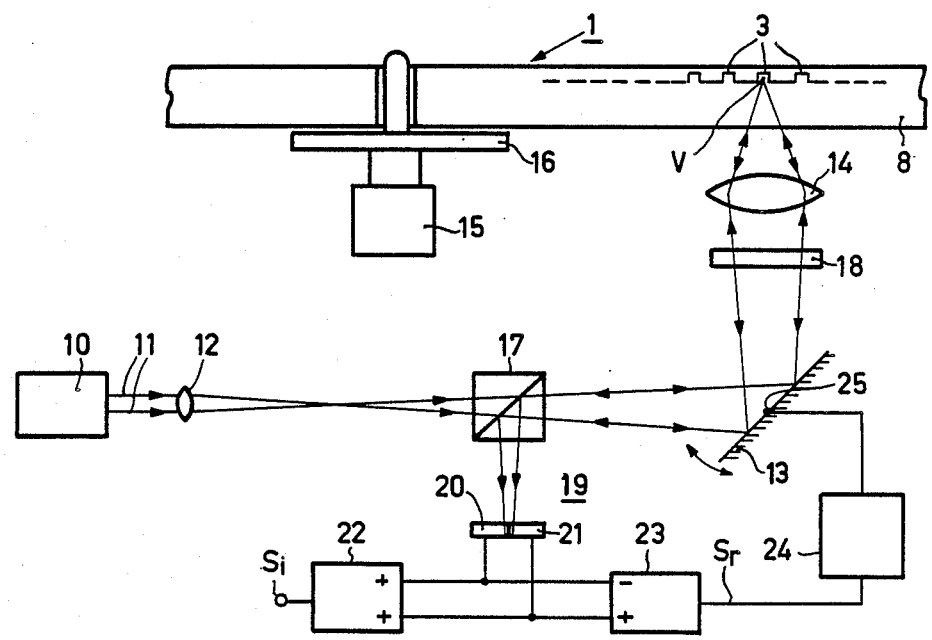
Figure 2:
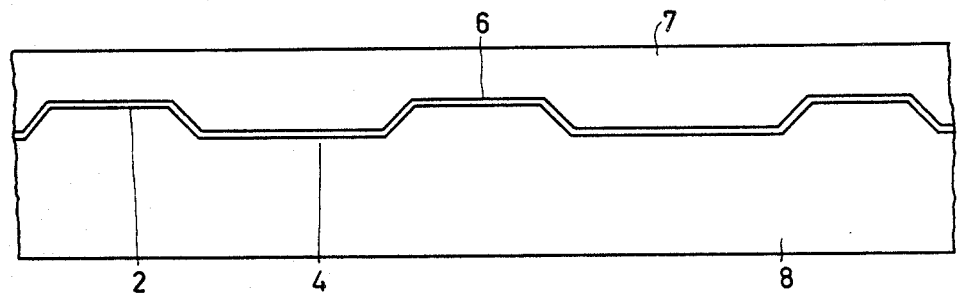
Figure 3:
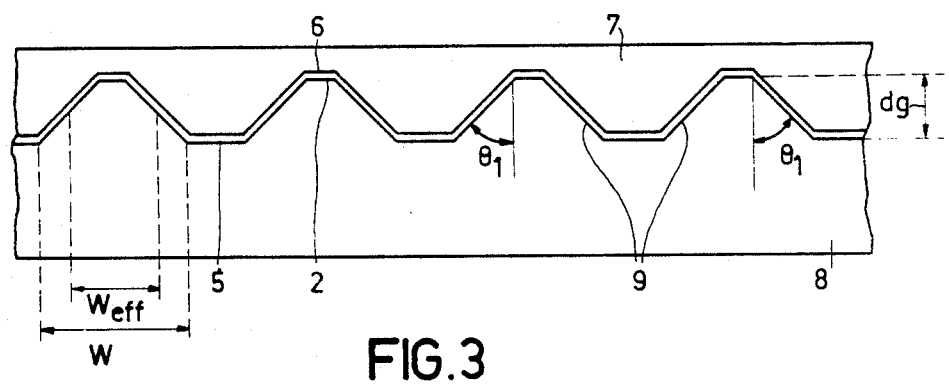
Figure 4:
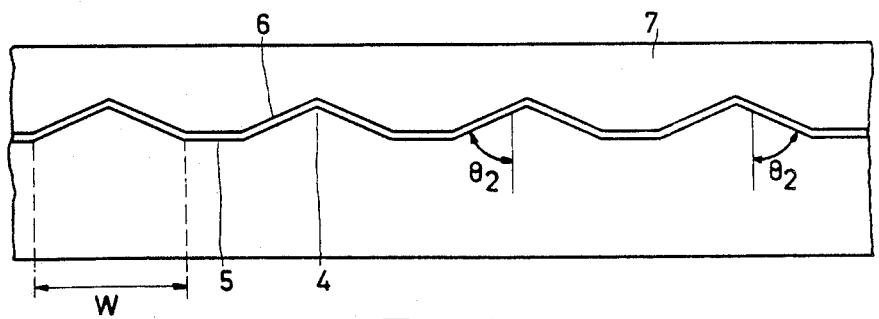
Figure 6:
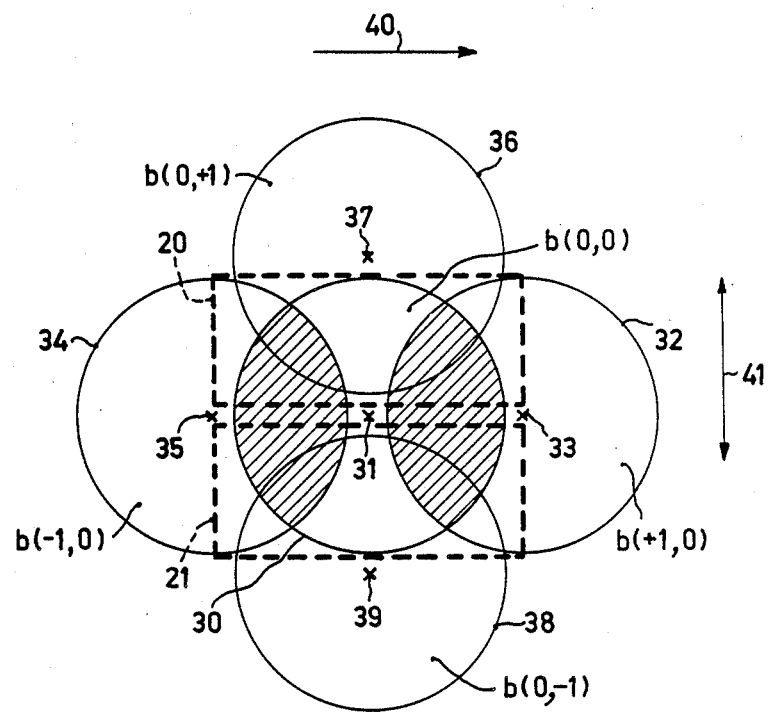
Figure 7:
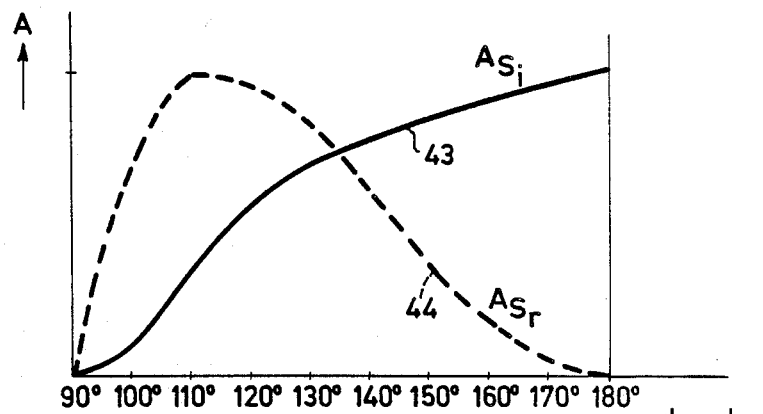
Figure 8:
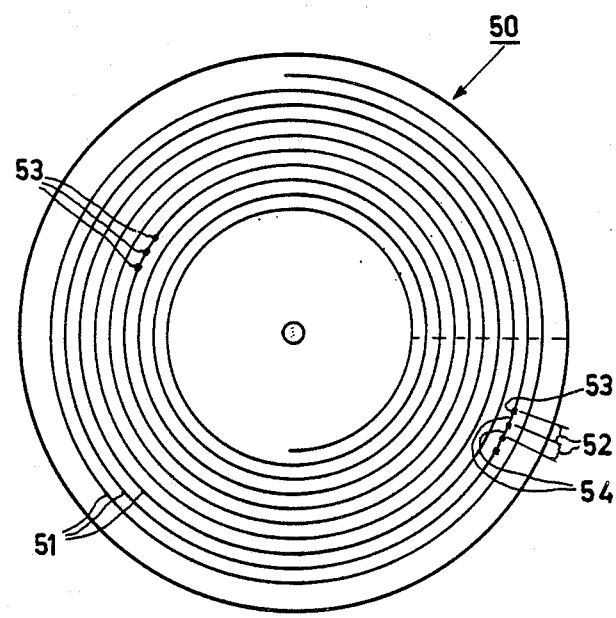

The invention will now be described in more detail with reference to the drawing. In the drawing:

FIG. 1 shows a part of the information structure of a round disc-shaped record carrier, FIG. 2 shows a part of tangential cross-section of a preferred embodiment of a record carrier in accordance with the invention, FIG. 3 shows a first radial cross-section of a part of a preferred embodiment of a record carrier in accordance with the invention, FIG. 4 shows a second radial cross-section part of a preferred embodiment of a record carrier in accordance with the invention, FIG. 5 shows a known apparatus for reading a record carrier, FIG. 6 shows cross-sections, in the far field of the information structure, of the zero-order subbeam and of the first-order subbeams, FIG. 7 shows the variation, as a function of the phase depth, of the amplitude of the information signal and of the tracking signal, and FIG. 8 shows a record carrier in which information can be recorded by the user.

As shown in FIG. 1, the information structure comprises a plurality of information areas 2, which are arranged in information tracks 3. In the track direction, or tangential direction t, the information areas are spaced from each other by intermediate areas 4. The tracks 3 are spaced from each other in the radial direction r by lands 5. The information areas may consist of pits pressed into the record carrier surface, or hills which project from the record carrier surface. The distance between the bottom of the pits or the top of the hills, and the plane of the lands is in principle constant, and so is the width of the information areas and intermediate areas at the level of the plane of the lands. Said distance and said width are not determined by the information which is stored in the structure.

The information to be conveyed by means of the record carrier, is contained in the variation of the structure of areas in the tangential direction only. If a colour television program is stored in the record carrier, the luminance signal may be encoded in the variation of the spatial frequency of the information areas 2 and the chrominance and sound signal in the variation of the length of the areas 2. Instead of a television program the record carrier may also contain an audio program. The information may also comprise digital information. In that case a specific combination of information areas 2 and intermediate areas 4 represents a specific combination of digital ones and zeros.

Such a record carrier with a radiation reflecting information structure can be read with an apparatus which is schematically represented in FIG. 5. A monochromatic and linearly polarized beam 11 emitted by a gas laser 10, for example a helium-neon laser, is reflected to an objective system 14 by a mirror 13. Arranged in the path of the radiation beam 11 is an auxiliary lens 12 which ensures that the pupil of the objective system 14 is filled. The beam is focussed to a diffraction limited spot V on the information structure which is schematically represented by the tracks 3. Consequently, the record carrier is shown in radial cross-section.

The information structure may be located on the record carrier side which faces the laser. However, preferably, as is shown in FIG. 5, the information structure is disposed on the side of the record carrier which is remote from the laser, so that reading is effected through the transparent substrate 8 of the record carrier. The advantage of this is that the information structure is protected against fingerprints, dust particles and scratches.

The read beam 11 is reflected by the information structure and, as the record carrier is rotated by means of a platter 16 which is driven by a motor 15, is modulated in accordance with the sequence of the information areas 2 and the intermediate areas 4 in a track being read at a given instant. The modulated read beam again passes through the objective system 14 and is reflected by the mirror 13. In order to separate the modulated read beam from the unmodulated read beam the radiation path preferably includes a polarization sensitive splitter prism 17 and a $\lambda_o/4$ plate 18, where $\lambda_o$ represents the wavelength in free space of the read beam. The prism 17 transmits the read beam 11 to the $\lambda_o/4$ plate 18, which converts the linearly polarized radiation into circularly polarized radiation which is incident on the information structure. The reflected read beam again passes through the $\lambda_o/4$ plate 18, the circularly polarized radiation being converted into linearly polarized radiation, whose plane of polarization is rotated through 90° relative to the radiation emitted by the laser 10. As a result of this, the read beam will be reflected to a radiation sensitive detection system 19 upon the second passage through the prism 17. This system comprises two detectors 20 and 21, the bounding line being effectively parallel to the track direction. The signals from the detectors 20 and 21 are applied to the circuit 22 in which the signals are added. The output signal $S_i$ of this circuit is modulated in accordance with the information being read. Moreover, the signals from the detectors 20 and 21 are applied to circuit 23, where the signals are subtracted from each other. The output signal $S_r$ of the circuit 23 provides an indication of the magnitude and the direction of a positional error of the read spot relative to the centre of the track being read. In the circuit 24 this signal can be processed, in a manner known per se, into a control signal for correcting the position of the read spot, for example by tilting the mirror 13 about the axis 25.

It will now be demonstrated why the values specified for the phase depth of the information areas and of the intermediate areas are optimum values. For the sake of simplicity it is then assumed that the information areas and the intermediate areas have perpendicular walls.

The information structure is illuminated with a read spot V whose size is of the order of magnitude of that of the information areas and intermediate areas. These areas may be regarded as a diffraction grating which splits the read beam into an undiffracted zero order subbeam, a plurality of first order subbeams and a pluraty of subbeams of higher orders. The numberical aperture of the objective system and the wavelength of the read beam are adapted to the information structure in such a way that the higher order subbeams fall largely outside the pupil of the objective system and do not reach the detection system 19. Moreover, the amplitudes of the higher order subbeams are low relative to the amplitudes of the zero order subbeam and the first order subbeams.

For the actual read out of the information structure it is mainly the subbeams diffracted in the track direction that are of importance. The cross-sections of those subbeams in the plane of the exit pupil of the objective system are shown in FIG. 6. The circle 30 with the center 31 represents the exit pupil. This circle also represents the cross-section of the zero order subbeam b(0,0). The circles 32 and 34, with the centers 33 and 35 respectively, represent the cross-section of the first order subbeam b (+1,0) and b (−1,0) respectively. The arrow 40 represents the track direction. The distance between the center 31 and the centers 33 and 35 is determined by $\lambda_o/p$, where p (compare FIG. 1) represents the spatial period of the information areas at the location of the read spot V.

In the above description of the read operation the latched areas shown FIG. 6 represent the regions where the first order subbeams b (+1,0) and b (−1,0) overlap with the zero order subbeam b (0,0) and that interference occurs.

The phase of the first order subbeams varies if the read spot moves relative to an information track. As a result of this the intensity of the total radiation passing through the exit pupil of the objective system will vary.

If the center of the read spot coincides with the center of an information area 2, there is a specific phase difference $\psi_1$, referred to as the phase depth of the information areas, between the first order subbeam and the zero order subbeam. If the read spot moves towards a next area, the phase of the subbeam b (+1,0) increases by 2λ. Therefore, it is correct to state that as the read spot moves in the tangential direction the phase of this subbeam relative to the zero order subbeam varies with ωt. Here, ω is a time frequency which is determined by the spatial frequency (1/p) of the information areas 2 and by the speed with which the read spot moves over a track. The phase $\phi$ (+1,0) and $\phi$ (−1,0), of the subbeam b (+1,0) and b (−1,0) respectively, relative to the zero order subbeam b (0,0) may be represented by $\phi$ (+1,0)=$\psi_1 \omega t$, and $\phi$ (−1,0)=$\psi_1 \omega t$ respectively During actual read-out of the information structure the total radiation energy passing through the pupil may be detected. This is the central aperture read mode in which the output signals of the detectors 20 and 21 are added to each other. The time dependent signal $S_1$, i.e. the information signal, may then be represented by $S_i = \beta(\psi_1) \cdot \cos \psi_1 \cdot \cos \omega t$, where $\beta(\psi_1)$ is an information-independent quantity and is a function of the phase depth. It is correct to state that $\beta(\psi_1)=0$ for $\psi_1=90°$.

In FIG. 7 the variation of the amplitude $A_{si}$ of the information signal $S_i$, i.e. the variation of $\beta(\psi_1)\cdot\cos \psi_1$ as a function of the phase depth $\psi_1$, is represented by the uninterrupted line 43. $\beta(\psi_1)\cdot\cos \psi_1$ is a maximum for $\psi_1=180°$. This applies to information areas with perpendicular walls, and to a good approximation, also to information areas with oblique walls.

The intensity distribution within the exit pupil is also dependent on the position of the read spot relative to the track center.

In addition to the subbeams b (+1,0) and b (−1,0) diffracted in the track direction subbeams b (0, +1) and b (0,−1) are also produced. Subbeams b (0,+1) and b (0,−1) are diffracted transversely to the track direction, i.e. in the direction of the arrow 41 in FIG. 6. In this Figure the cross-sections of the subbeams b (0,+1) and b (0,−1) are represented by the circle 36 with center 37 and the circle 38 with the center 39 respectively. At the location of the detectors 20 and 21 the subbeams interfere with the zero order subbeam b (0,0). When it is assumed for the sake of simplicity that the tracks are continuous grooves having a phase depth $\psi_2$, the phase $\phi(0,+1)$ and $\phi(0,-1)$ of the subbeam b (0,+1) and b (0,−1) respectively relative to the subbeam b (0,0) may be represented by:

$\phi(0,+1) = \omega_2 + 2\pi\Delta r/q$, and $\phi(0,-1)\psi_2 - 2\pi\Delta r/q$, respectively, where $\Delta r$ is the distance between the center of the read spot and the track center and q the radial period of the track structure (compare FIG. 1). The position-dependent output signals of the detectors 20 and 21 may be represented by:

$S_{20} = C(\psi_2)\cdot\cos (\psi_2 + 2\pi\Delta r/q)$ and $S_{21} = C(\psi_2)\cdot\cos (\psi_2 - 2\pi\Delta r/q)$, where $C(\psi_2)$ is an information-independent quantity which is a function of the phase depth $\psi_2$. For $\psi_2=90°$ it may be assumed that $C(\psi_2)$ is zero. The difference signal, or push-pull signal, $S_r$ is
$S_r = -2C(\psi_2)\cdot\sin \psi_2\cdot\sin 2\pi\Delta r/q$.

The component $\sin 2\pi\Delta r/q$ is an odd function of $\Delta r$, so that the signal $S_r$ contains information regarding the magnitude and the direction of a positional error of the read spot relative to the track centre.

It can be demonstrated that the amplitude, $C(\psi_2) \sin \psi_2$, of the push-pull signal $S_r$ is a maximum for $\psi_2=115°$. This is then valid for areas with perpendicular walls. For areas with oblique walls the expression for $S_r$ is different and more intricate than stated above. The variation of the amplitude $A_{S_r}$ as a function of the phase depth $\psi_2$, for areas with oblique walls is represented by the dashed curve 44 in FIG. 7. The maximum for the amplitude is reached for a phase depth $\psi_2=110°$. Thus, if the intermediate areas in a record carrier in accordance with the invention have a phase depth of $\psi_2=110°$, an optimum tracking signal is obtained.

As can be seen in FIG. 7, the areas with a phase depth of 110° will also produce a small signal in the case of central aperture reading. This means that the modulation depth of the information signal $S_i$ decreases slightly. This effect can be reduced by diminishing the phase depth $\psi_2$ of the intermediate areas. Preferably, $\psi_2 100°$. Areas with such a phase depth yield a negligible signal in the case of central aperture reading, while in the case of push-pull reading the signal $S_r$ does not decrease significantly relative to the signal $S_r$ which is obtained for a phase depth $\psi_2 = 110°$.

The values specified above for the phase depth $\psi_2$, 115° for intermediate areas with perpendicular walls and 100° for intermediate areas with oblique walls, are not strict values. A reasonable readout signal is obtained for small deviations from these values.

As previously stated the intermediate areas are preferably V-shaped. In order to obtain the desired phase depth the angle of inclination should lie between 80° and 85°. The geometry of the intermediate areas is then defined fairly accurately. The influence of the read beam on the optimum structure of the intermediate areas is small. The optimum value $\psi_2 = 100°$ is attained when using a He-Ne laser beam with $\lambda_o = 633$ nm for an angle of inclination of 84°, and when an AlGaAs laser beam is used with $\lambda_0$ between 780 nm and 860 nm at an angle of inclination of 82°. The state of polarization of the read beam has a slight influence on the observed phase depth of the intermediate areas in the case of push-pull scanning.

However, for the information areas the desired phase depth $\psi_1 = 180°$ can be obtained, independently of the wavelength of the read beam and its state of polarization, with information area geometries which exhibit comparatively great differences relative to each other.

For the record carrier described here, which is for example intended for large-scale dissemination of television or audio programs, it is important that the information can be recorded on a "master" in a well-defined manner, and that, starting from an inscribed master a large number of copies, i.e. record carriers to be played by the consumer, can be manufactured. In practice these requirements result in record carriers in which the walls of the information areas 2 have angles of inclination which differ substantially from 0°.

The article: "Laser beam recording of video master disks" in "Applied Optics", Vol. 17, No. 13, pages 2001-2006, describes how the information areas can be inscribed. A photoresist layer on a substrate is exposed to a laser beam whose intensity is switched between a high level and a low level in conformity with the information to be written. After writing, the photoresist is developed, pits being formed at those locations which have been exposed to a high radiation intensity. The intermediate areas in the record carrier in accordance with the invention can be obtained by switching the intensity of the write beam during writing between a high level and a lower level, for example of the order of 40%-60% of the high level. During development, the deeper information pits 2 are formed at the locations which have been exposed to a high radiation intensity and the less deep intermediate pits 4 are formed at the locations which have been exposed to the lower radiation intensity.

Because of the intensity distribution within the write beam, the final record carrier will have oblique walls. The developing process also influences the wall steepness since the wall steepness increases with an increase of the developing time.

From the developed master so-called mother discs are made in known manner and these in turn are used, to make matrixes. By means of the matrixes a large number of record carriers can be manufactured. In order to facilitate separation of the copies from the matrix, the angle of inclination of the walls should preferably be as large as possible. Thus, as a result of the method used for writing and copying, the angle of inclination will have a specific value which deviates from zero degrees.

In the case of a record carrier which is to be read with a He-Ne beam or with a beam of comparable wavelength, the effective width of the information areas 2 is greater than the effective wavelength and the negative effect on the phase depth of the larger angle of inclination, which in itself is desirable, is compensated for by increasing the geometrical distance between the plane of the information areas and the plane of the lands.

FIG. 2 shows a small part of a preferred embodiment of a record carrier in accordance with the invention in tangential cross-section, taken on the line II—II in FIG. 1, while FIG. 3 shows a first radial cross-section, taken on the line III—III' in FIG. 1, and FIG. 4 a second radial cross-section, taken on the line IV—IV' in FIG. 1. During reading the record carrier is illuminated from the underside, the substrate 8 being used as an optical protective layer. The information structure may be covered with a layer 6 of a highly reflecting material, for example silver, aluminium or titanium. Moreover, a protective layer 7 may be provided on the layer 6, which protects the information structure from mechanical damage, such as scratches.

FIG. 3 shows the angle of inclination $\phi_1$ of the walls of the information areas 2. It has been found that for optimum reproducibility of the write process and the copying process the angle of inclination $\theta_1$ should be of the order of 45° to 50°. However, acceptable results are obtained in the case of reading with a He-Ne beam with angles of inclination $\theta_1$ which lie in the range from approximately 30° to approximately 65°. The angle of inclination $\phi_2$ of the intermediate areas shown in FIG. 4 is larger than the angle of inclination $\theta_1$ and lies in the range from 80°-85°.

FIG. 3 furthermore gives the maximum width w and the effective width $w_{eff}$ of the information areas 2. For an embodiment of a record carrier for which w=625 nm, $\theta_1 = 45°$ and a geometrical depth dg=130 nm, $w_{eff} = 495$ nm. If this record carrier is read with a read beam having a wavelength $\lambda_o = 633$ nm (He-Ne beam) and if the refractive index N of the substrate 8 is 1.5, the effective wavelength is smaller than $w_{eff}$.

For this situation the phase depth $\psi_1$ greatly depends on the angles of inclination $\psi_1$; each value of the angle of inclination corresponds to a specific optimum vaue of the geometrical depth $d_g$. For example, an angle of 30°, 50° and 60° corresponds to a geometrical depth $d_g$ of 114 nm, 135 nm and 173 nm, respectively.

For reading a record carrier in accordance with the invention , a semiconductor diode laser is preferably used as a radiation source, for example an AlGaAs diode laser which emits a wavelength in the range from approximately 780 nm to approximately 860 nm.

When an AlGaAs diode laser is used instead of the gas laser, which was assumed to be used in FIG. 5, no steps need be taken in order to prevent feedback of radiation reflected by the information structure to the laser. On the contrary, effective use can be made of the feedback during reading, as is described in U.S. Pat. No. 3,941,945. This means that in the read apparatus no polarizing means, such as the $\lambda/4$ plate 18 and the prism 17 in FIG. 5 need be used. If the diode laser emits linearly polarized radiation, then, without any further steps, the information structure will be illuminated with linearly polarized radiation and not with circularly polarized radiation as has been assumed in FIG. 5.

When reading is effected with a diode laser with a longer wavelength, the requirement that $w_{eff}$ should be greater than $\lambda_{eff}$ is no longer met, unless the width w were increased, which is not preferred in view of the information density. When the effective wavelength is equal to or greater than the effective width, the state of polarization of the read beam will have a substantial influence on the phase depth of the information areas. When a perpendicularly polarized read beam is used, an elongate pit or elongate hill seems to be deeper of higher respectively, than in the case of a parallel polarized or circularly polarized read beam. This effect also occurs, though to a smaller extent, for a read beam whose effective wavelength is smaller than the effective width, and this is particularly so for the intermediate areas with a small geometrical depth or height. A perpendicularly or parallel polarized read beam is to be understood to mean a read beam whose electric field vector, the E-vector, is perpendicular or parallel to the longitudinal direction of the pits or hills.

Furthermore, it has been found that the influence of the wall steepness of the information areas on the phase depth $\psi_1$ is slight: for the values of the effective wavelength and the effective width of the information areas and intermediate areas considered here, the read beam caan hardly discriminate between different angles of inclination of the information areas in the central aperture mode. This means that for a record carrier which is adapted to be read with an AlGaAs read beam the angle of inclination $\theta_1$ may have an arbitrary value between 25° and 60°, provided that this angle of inclination is substantially constant over the entire record carrier. For push-pull reading different slopes of the intermediate areas can be distinguished. The angle of inclination $\theta_2$ then lies within narrow limits.

For this record carrier the optimum value for the geometrical depth $d_g$ of the information areas is approximately 130 nm (at N=1.5) Reading should then be effected with a perpendicularly polarized read beam. However, also for greater values of $d_g$ of the information areas, the record carrier is still satisfactorily readable. The upper limit for $d_g$ lies at approximately 150 nm. A record carrier whose geometrical depth $d_g$ approximates this upper limit need no longer be read with a perpendicularly polarized beam, but may also be read with a parallel polarized or circularly polarized beam. For any value of $d_g$ between 130 nm and 150 nm the angle of inclination $\theta_1$ may also have an arbitrary value between 30° and 60°. In respect of the intermediate areas it is to be noted that for an angle of inclination $\theta_2 = 85°$ a perpendicularly polarized beam is preferred, while for an angle of inclination of 80° a parallel polarized or circularly polarized beam may be used.

So far it has been assumed that the information structure is a radiation reflecting structure. The invention may also be used in conjuction with a radiation transmitting record carrier. The detection system 19 is then disposed on the other side of the record carrier and the radiation source. Also in that case the phase depth of the information area should be approximately 180°, while the phase depth of the intermediate areas should be between 95° and 145°. In order to obtain this phase depth, the geometry of the information structure should differ from that of the radiation reflecting information structure described above. The geometrical depths, or heights, of the information areas and intermediate areas for a radiation transmitting record carrier will be approximately twice as large as the depths, or heights, of the areas for a radiation reflecting record carrier.

In for example the copending application Ser. No. 925,229, filed July 17, 1978 and assigned to the assignee of the present application, it has been proposed to employ an optical record carrier as a storage medium for information other than video information and especially as a storage medium in which the user himself can record information. Examples of this are information supplied by an (office) computer or radiograms made in a hospital. For this application the user is supplied with a record carrier which is provided with a so-called servo-track, which is for example spiral-shaped, which track extends over the entire record carrier surface.

During recording of the information by the user the radial position of the write spot relative to the servo track is detected and corrected with the aid of an optoelectronic servo system, so that the information is written in the sprial track of constant pitch with great accuracy. The servo track is divided into a plurality of sectors, for example 128 per revolution. FIG. 8 is a plan view of such a record carrier 50. The servo track is designated 51 and the sectors 52. Each sector comprises a track portion 54 in which the information may be written and a sector address portion 53, in which inter alia the address of the associated track portion 54 is encoded in address areas, for example, in digital form. The address areas are spaced from each other in the track direction by intermediate areas. The address areas may consist of pits pressed into the record carrier surface of hills projecting from this surface.

In accordance with the invention the address areas comprise pits or hills having a first phase depth and the intermediate areas pits or hills having a second phase depth, the second phase depth being smaller than the first phase depth, in a similar way as described in the foregoing for the information areas and the intermediate areas in the record carrier containing a video programme. A tangential cross-section through the sector addresses will then be as shown in FIG. 2. Preferably, the sector addresses of all tracks are disposed within the same circle sectors. In that case the radial cross-section through the address areas or the intermediate areas will be as is shown in FIG. 3 and FIG. 4 respectively.

The "blank" track portions 54 may consist of continuous grooves in which a layer of a reflecting material is deposited which, if exposed to suitable radiation, is subject to an optically detectable change. The layer for example consists of bismuth, in which information areas can be formed by melting.

The "blank" track portions may be constituted by V-shaped grooves. In order to enable an optimum tracking signal to be derived by means of push-pull reading during recording with these grooves, said grooves, as follows from the preceding, should have a phase depth which is approximately 110°. In the case of central aperture reading of the record carrier inscribed by the user, in which pits are melted in the V-shaped grooves, the groove portions between the pits will give rise to a small signal if these groove portions have a phase depth of 110° (compare FIG. 7). Therefore, the phase depth of the blank grooves should preferably be 100°, so that during central aperture reading of the inscribed record carrier these grooves are hardly "viewed" any longer.

The invention has been explained with reference to a round disc-shaped record carrier. However, the invention may also be used in other record carriers, such as tape-like or cylindrical record carriers.

What is claimed is:

1. A record carrier comprising an optically readable information structure having information areas arranged in tracks and spaced from each other in the track direction by intermediate areas, said tracks being spaced from each other by intermediate lands, said information areas having a configuration such that, upon illumination thereof by a beam of radiation with which said information structure is to be read, said information areas produce a substantially constant phase difference of approximately 180° between the zero order subbeam and the first order subbeam diffracted thereby and said intermediate areas differing optically from said lands and having a configuration such that, upon illumination thereof by said radiation beam, said intermediate areas produce a substantially constant phase difference of between 95° and 145° between the zero and first order subbeams diffracted thereby.

2. A record carrier according to claim 1 wherein said lands are substantially coplanar and define a first plane, said intermediate areas are projections or depressions extending above or below said first plane, respectively, and have walls extending in the track direction which are inclined at an angle between 80° and 85° with respect to a line normal to said first plane.

3. The record carrier according to claim 2 wherein said intermediate areas have a generally V-shaped cross-section in a plane transverse to the track direction.

4. The record carrier according to claim 1, 2 or 3 wherein said phase difference produced by said intermediate areas is between 100° and 110°.

5. The record carrier according to claim 2 including a layer of material generally transparent to radiation with which said information structure is to be read, said layer extending over said information structure, and wherein said information areas are projections or pits extending above or below said first plane, respectively, and having planar regions lying generally in a plane parallel to and spaced from said first plane by a distance between 165/N nm and 270/N nm, where N is the refractive index of said transparent material, said information areas further having walls extending in the track direction which are inclined at an angle between 25° to 65° with respect to said line.

6. The record carrier according to claim 5 wherein said optical structure is adapted to be read by light having a wavelength of approximately 633 nm and wherein said information areas and said intermediate areas have a width in a direction transverse to the track direction of approximately 625 nm, said angle of inclination of said walls of said information areas is between 45° and 50°, said distance is approximately 195/N nm, said phase difference produced by said intermediate areas is approximately 100° and said angle of inclination of said walls of said intermediate areas is 84°.

7. The record carrier according to claim 5 wherein said optical structure is adapted to be read by light having a wavelength of between 780 nm and 860 nm and wherein said information areas and said intermediate areas have a width in a direction transverse to the track direction of approximately 625 nm, said angle of inclination of said walls of said information areas is between 30° and 60°, said distance is approximately 195/N nm, said phase difference produced by said intermediate areas is approximately 100° and said angle of inclination of said walls of said intermediate areas is 82°.

8. The record carrier according to claim 5, 6, or 7 wherein said information structure is radiation reflecting.

9. The record carrier according to claim 1 wherein at least one of said tracks has at least one sector extending in the track direction, said sector having a first portion with one or more of said information areas defining an address for that sector, and a second portion containing a material capable of undergoing an optically detectable change when exposed to radiation.

10. The record carrier according to claim 9 wherein said material is radiation reflecting and said second portion produces a phase difference of approximately 100°.

11. The record carrier according to claim 10 wherein said second portion has a groove extending in the track direction.

12. A record for storing optically readable information comprising a planar member having on one surface thereof a plurality of information pits or projections extending below or above said one surface, respectively, adapted to be scanned by a beam of light to derive said information, said information pits or projections beng arranged in a plurality of spaced apart tracks and being spaced from each other in the track direction by intermediate depressions or projections, said information pits or projections having walls extending in the track direction which are inclined at an angle between 25° to 65° with respect to a line normal to said one surface and said intermediate depressions or projections having walls extending in the track direction which are inclined at an angle of between 80° to 85° with respect to said line.

13. A record carrier comprising an optically readable information structure having information areas arranged in elongated tracks and spaced from each other in the track direction by intermediate areas, said tracks being spaced from each other by intermediate lands and containing information which is detectable by a beam of radiation which is modulated by said information areas when a given track is scanned by the beam, said information areas being adapted to be detected by one of a central-aperture detection mode and a push-pull detection mode, and wherein said intermediate areas differ optically from said lands and said information areas, are adapted to be detected by the other of said central-aperture and push-pull detection modes and define a servo track for maintaining the beam centered on the track being scanned.

14. The record carrier according to claim 13 wherein said information areas are adapted to be read by said central-aperture detection mode and said intermediate areas are adapted to be read by said push-pull detection mode.

15. The record carrier according to claim 14 wherein said lands are coplanar, said information areas are projections extending above the plane defined by said lands or depressions extending below said plane by a first predetermined distance, and said intermediate areas are projections extending above said plane or depressions extending below said plane by a second predetermined distance which is smaller than said first distance.

16. The record carrier according to claim 15 wherein said information and intermediate areas have walls extending in the track direction which are inclined at an acute angle with respect to a line normal to said plane and have an effective width in a direction transverse to the track direction which is larger than the effective wavelength of said radiation.

17. A record carrier comprising a disc provided with an information structure containing information readable by a beam of radiation, said disc being of a material which is generally transparent to said radiation said information structure having a plurality of generally circular tracks which extend about the center of said disc and which are spaced from each other by lands which define one surface of said optical structure, said tracks each having a plurality of information areas defined by depressions extending below said one surface by a first predetermined distance which is between 165/N nm and 270/N nm, where N is the refractive index of said disc, said information areas being spaced apart in the track direction by intermediate areas defined by depressions extending below said one surface by a second predetermined distance which is different from said first distance, said depressions defining said intermediate areas having a V-shaped cross-section in a plane transverse to the track direction and walls extending in the track direction which are inclined at an angle between 80° and 85° with respect to a line normal to said one surface, and including a radiation reflective layer extending over said one surface and covering the surface of said depressions.

18. The record carrier according to claim 17 wherein said depressions defining said information areas have walls extending in the track direction which are inclined at an angle between 25° and 65° with respect to said line.

* * * * *